W. V. D. KELLEY.
GAS BURNER.
APPLICATION FILED JAN. 28, 1908.
937,002.
Patented Oct. 12, 1909.
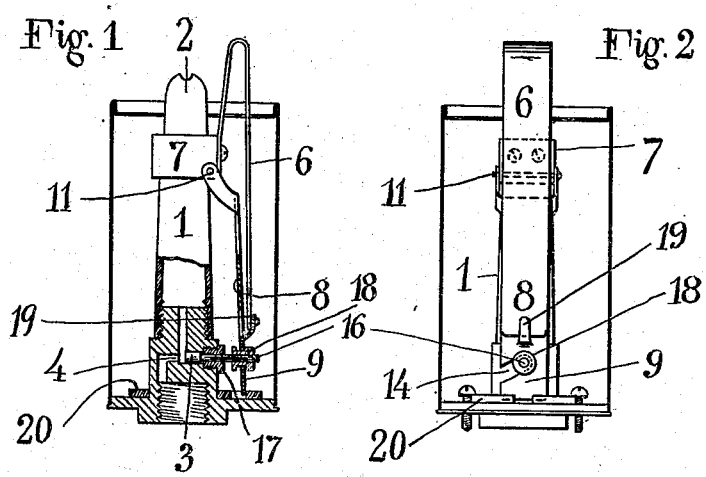
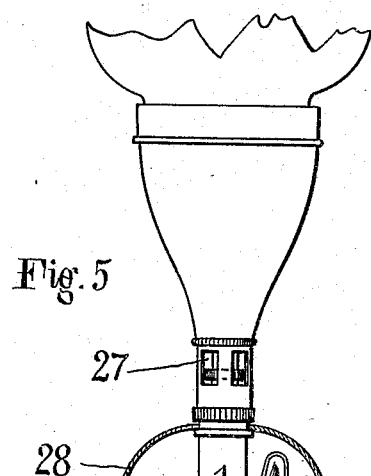
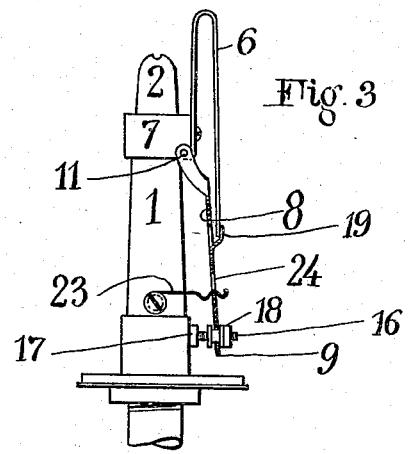
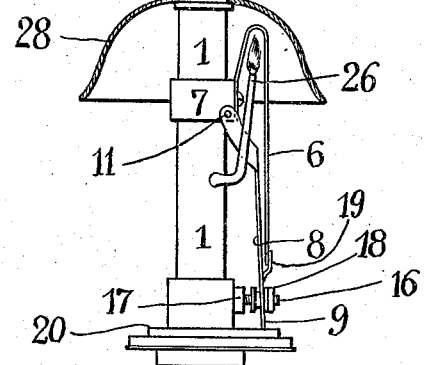
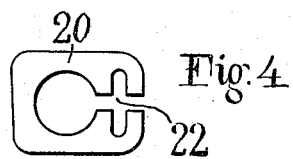
Witnesses
Edmund O. Duboq.
Geo. N. Kerr.
Inventor
William V. D. Kelley,
By his Attorneys
Edwards, Sager & Wooster

UNITED STATES PATENT OFFICE.

WILLIAM V. D. KELLEY, OF NEWARK, NEW JERSEY.

GAS-BURNER.

937,002.  Specification of Letters Patent.  Patented Oct. 12, 1909.

Application filed January 28, 1908. Serial No. 412,966.

*To all whom it may concern:*

Be it known that I, WILLIAM V. D. KELLEY, a citizen of the United States, residing at Newark, in the county of Essex and State of New Jersey, have invented certain new and useful Improvements in Gas-Burners, of which the following is a full, clear, and exact specification.

This invention relates to gas burners and more particularly has reference to improvements in thermostatically controlled gas burners wherein the gas is automatically turned off and on in order to periodically illuminate a sign or other transparency, or in other relations where it is desired to periodically vary the heat or light derived from a gas flame.

More particularly, the invention relates to gas burners of the type patented to me in Patent No. 872,350, dated December 3, 1907, and this application is particularly concerned with an improved form of apparatus for attaining the same result.

The object of this invention is to provide an actuating connection between the thermostat and the gas valve such that the actuation of the valve will not be affected by inequalities in the expansion and contraction of the thermostat. Where the vibratory end of the thermostat directly actuates the gas valve, there is an irregularity of action due to the variable expansion and contraction of the thermostat, as the thermostat sometimes expands to one side and sometimes in such manner as to move the vibrating end up and down.

According to this invention I have mounted on the burner tube a lever for actuating the gas valve, and cause the thermostat to actuate this lever, an actuating connection between the thermostat and the lever being provided such as to permit a certain amount of movement of the thermostat or lost motion, independently of the lever, so that the varying action of the thermostat will not affect the actuation of the valve. In combination with the thermostat and the valve operating lever controlled thereby, is a retarding device, herein shown as a magnet or a spring latch, acting to retard the initial movement of the valve so that it will be caused to snap back and forth from one position to the other.

The invention will be more fully described in connection with the accompanying drawing, wherein—

Figure 1 is a side view partially in section of my improved gas burner; Fig. 2 is an end view; Fig. 3 is a side view of a modified construction wherein a spring latch is used for initially retarding the actuation; Fig. 4 is a plan view of a magnet; and Fig. 5 is a view of a Bunsen burner for an incandescent gas light provided with the invention, and operated by a pilot light.

1 represents a gas pillar having a burning tip 2, and a controlling cock 3 controlling a gas passage 4, so that the flow of gas is determined according to the position of the cock 3. In one position, a full flow of gas is permitted and in the other position only enough supply of gas is permitted to keep the flame lighted. In addition to this automatic cock, a supply pipe will be provided with a hand cock in order to completely cut off the flow when the device is not in operation.

In order to operate the cock 3, a thermostat 6 preferably composed of two dissimilar metals is provided. The thermostat 6 is secured to a support 7 carried by the pipe 1 and is curved upwardly and then downwardly to provide the free actuating end 8, from which the cock 3 is operated. The curved portion of the thermostat 6 is positioned so as to extend preferably into the blue portion of the ordinary illuminating gas flame and be heated thereby when the passage 4 is wide open at cock 3, which will cause the free end 8 to vibrate in such a direction as to cut down the flow of gas, whereupon the thermostat will cool and move to turn on the gas. This action will continue automatically as long as the flame is kept lighted.

In practice it is found that the vibrating end 8 of the thermostat is subject to considerable deviation, both laterally and vertically by reason of variation in the degree of heating by the gas flame, and this deviation may produce an irregular actuation of the cock. In order to prevent this, the cock is actuated by a lever 9 which is pivoted at 11 on the support 7, the lever having a slot 14 through which the stem 16 of the cock 3 passes. The stem 16 of the cock 3 passes through a bushing 17 and the flow of gas is varied by reciprocating the cock, though this invention may be applied to an oscillatory cock such as is shown in my patent aforesaid, by rearranging the parts. The threaded stem 16 carries a shouldered nut 18 which may be turned to regulate the position of the lever, and thereby regulate the throw of the cock 3. This adjustment permits the size of the gas flame when the flow is restricted to be regulated. The actuating connection between the lever 9 and the end 8 of the thermostat 6 is a loose connection pemitting independent lateral and vertical movement of the thermostat 6 without affecting the lever, and also a slight inward or downward movement in the normal expansion and contraction of the thermostat. As herein shown this connection comprises a lug or clip 19 on the lever 9, and embracing the end 8 of the thermostat and spaced from the lever 9 so as to permit a certain amount of free movement of the end of the thermostat in all directions without moving the lever. In the position shown in Figs. 1 and 3, the flame is supposed to be burning at full power and heating the bent portion of the thermostat. The expansion will tend to throw the end 8 inward until it strikes the lever 9 whereupon further movement will close the cock 3 to cut down the flow of gas. This will permit the thermostat to cool off and the free end 8 will move outward, the first movement being an independent movement until the free end 8 strikes the lug 9 whereupon the lever will be thrown and the cock to turn up the gas flame for again heating the thermostat, this action continuing as long as the flame is kept lighted. By reason of this loose connection between the actuating end of the thermostat and the lever, inequalities in expansion of the thermostat will not affect the lever, nor the actuating connection of the valve, this result being due to the independent motion permitted the thermostat. Also after the lever has been given the initial start, the magnet or the latch will carry it to the opposite pole without help, the loose movement permitting this.

In order to shorten the transition periods, that is to say the periods during which the cock is moving from one position to the other, retarding means is provided for restraining the initial movement of the lever until the thermostat exerts such a force as to suddenly overcome the retarding means and in effect snap the valve from one position to the other. In Fig. 1 the restraining means comprises a magnet 20, (Fig. 4), having an interpolar space 22 in which the free end of lever 9 vibrates, the lever 9 being preferably made of magnetic material to act as an armature. The magnetic attraction is sufficiently strong to hold the lever armature 9 at either side of the slot 22 against the initial pull due to the thermostat after it has taken up its lost motion with the lever. When this magnetic pull is overcome the armature will be snapped quickly to the other side of the slot and the valve correspondingly quickly moved, the latter end of each movement being of course accelerated and increasing the magnetic pull as the armature approaches the end of its movement.

Instead of a magnet, a spring latch 23 as in Fig. 3 may be used passing through a slot 24 or other engaging projection in the lever 9. In this form, the resiliency of the spring 23 holds the lever 9 at either extreme until the force of the thermostat is sufficient to overcome its resiliency and snap the valve in the same manner as before described.

In Fig. 5, the invention is shown for flashing an incandescent gas burner, wherein the thermostat is operated by a small pilot light 26 which is varied by a valve 3 in the same manner as before described. To prevent the pilot light 26 from lighting the Bunsen burner at the air holes 27, a hood 28 is provided.

The particular construction herein shown and described may be varied without departing from the scope of the invention.

Having thus described my invention, I declare that what I claim as new and desire to secure by Letters Patent, is,—

1. The combination with a gas burner, of a bimetallic thermostat disposed in proximity thereto to be heated by the flame, a gas regulating cock arranged to restrict the flame when the thermostat is heated, a lever pivoted on said burner and connected to actuate said cock, and an actuating connection between said lever and a movable portion of said thermostat, whereby the cooling of the thermostat opens the cock.

2. The combination with a gas burner, of a bimetallic thermostat disposed in proximity thereto to be heated by the flame, a gas regulating cock controlled by the thermostat to close and open when the thermostat is heated and cooled, an intermediate actuating element for the cock operated in both directions by the thermostat, and an actuating connection between said intermediate element and the thermostat.

3. The combination with a gas burner, of a thermostat disposed in proximity thereto to be heated by the flame, a gas regulating cock controlled by the thermostat, an intermediate actuating element for the cock, and an actuating connection permitting irregular independent movement of the thermostat, without affecting the normal actuation of the cock by the alternate heating and cooling of the thermostat.

4. The combination with a gas burner, of a bimetallic thermostat disposed in proximity thereto to be heated by the flame and having one end free to vibrate, a gas regulating cock controlled by the thermostat, an intermediate element for actuating the cock engaged by the end of the thermostat, an actuating connection between said intermediate element and the end of the thermostat, and means for retarding said element to cause a quick actuation of the cock by said element.

5. The combination with a gas burner, of a thermostat disposed in proximity thereto to be heated by the flame, a gas regulating cock controlled by the thermostat, an intermediate pivoted actuating armature for the cock, an actuating connection between said armature and the thermostat permitting independent movement of the thermostat, and a magnet for retarding the movement of said armature until overcome by the thermostat, to cause a quick actuation of the cock by said armature.

6. The combination with a Bunsen gas burner, of a pilot burner, a thermostat disposed in proximity to the pilot burner to be heated thereby, a gas regulating cock for both burners controlled by said thermostat, an intermediate actuating element between said thermostat and said cock and permitting limited independent movement of said thermostat, and means for initially retarding the movement to secure a quick actuation of the cock.

In testimony whereof I affix my signature in presence of two witnesses.

WILLIAM V. D. KELLEY.

Witnesses:
    JULIAN S. WOOSTER,
    GEO. A. HOFFMAN.